United States Patent [19]

Campbell

[11] Patent Number: 5,019,904
[45] Date of Patent: May 28, 1991

[54] SCAN CONVERTER WITH ADAPTIVE VERTICAL FILTER FOR SINGLE BIT COMPUTER GRAPHICS SYSTEMS

[76] Inventor: Jack J. Campbell, 1161 DeHaro St., San Francisco, Calif. 94110

[21] Appl. No.: 445,369

[22] Filed: Dec. 4, 1989

[51] Int. Cl.⁵ .................. H04N 7/01; H04N 7/04; H04N 11/20; H04N 11/06
[52] U.S. Cl. .................................. 358/140; 358/141; 358/11; 358/12
[58] Field of Search ............... 358/140, 141, 11, 12; 340/728; 382/54, 47; 364/521

[56] References Cited

U.S. PATENT DOCUMENTS

| | | | |
|---|---|---|---|
| 4,698,674 | 10/1987 | Bloom | 358/140 |
| 4,837,619 | 6/1989 | Tsinberg | 358/140 |
| 4,891,701 | 1/1990 | Shekima et al. | 358/140 |
| 4,937,667 | 6/1990 | Choquet et al. | 358/140 |

Primary Examiner—John K. Peng
Attorney, Agent, or Firm—David B. Harrison

[57] ABSTRACT

A television scan conversion method receives and stores incoming pixel bits are stored in a pixel memory array at a first scan rate. Vertical columns of adjacent pixel bits of plural scan lines from the pixel memory array are read out at a second scan rate. A filter coefficient is generated by detecting a bit pattern located in each vertical column of pixel bits retrieved from the pixel memory array. Delay matched predetermined adjacent groups of pixel bits in each vertical column are adaptively low pass filtered in response to the filter coefficient so as to minimize video flicker artifacts in a resultant stream of interpolation pixels in accordance with the bit patterns detected by the pattern recognition filter coefficient generator. An interpolation coefficient is generated for each interpolation pixel, and plural-bit interpolation pixels are put out as a stream at the second scan rate.

20 Claims, 2 Drawing Sheets

SCAN CONVERTER WITH ADAPTIVE VERTICAL FILTER FOR SINGLE BIT COMPUTER GRAPHICS SYSTEMS

FIELD OF THE INVENTION

The present invention relates to video signal processing methods and equipment. More particularly, the present invention relates to scan conversion with adaptive vertical filtering for flicker reduction for use with single bit per pixel computer graphics systems.

BACKGROUND OF THE INVENTION

Single bit per pixel graphic image systems, such as those employed by popular personal computers such as the Apple MAC+ and MAC SE (tm), are very limited in the types of pictures that can be displayed on the display device, usually a cathode ray tube. One of the techniques that one bit-per-pixel based images may be made to appear to have a gray scale is by "half toning". By half toning is meant the technique of controlling the arrangement and number of black (or white) pixels so as to create the appearance of shading. Another technique is "patterning". By patterning is meant the process of creating a vertical and/or horizontal small area pattern of pixels, and then repeating this stored pattern over and over again in both dimensions.

Computer graphics systems, particularly those of the single-bit-per-pixel variety, typically employ a progressive scan format and typically have a number of scan lines which does not correlate to the number of scan lines of the conventional NTSC interlaced scan format of the commercial broadcast television signal standard. While computer graphics systems typically come equipped with some display device, such as a nine-inch cathode ray tube, many emerging computer graphics applications are facilitated by or actually require scan conversion so that the computer graphics image may be displayed on conventional NTSC interlaced scan display devices.

When a one-bit-per-pixel graphic image is scan-converted into another scan rate, half tones and patterns can be very difficult to represent due to sampling limitations (i.e., Nyquist limit problems). One major problem arising from such scan conversion is flicker which is apparent in the scan-converted resultant image display. Flicker is a particularly severe problem when progressively scanned computer graphics images are converted into an interlaced scan format for display on conventional television signal format image display devices. If the energy at a location in the resultant scan-converted interlaced video image is unequal from field to field, flicker results, the intensity of which being dependent upon the energy differential from field to field.

While scan converters are known in the prior art, one prior solution to the flicker problem is simple vertical low pass filtering to eliminate or sharply curb the appearance of flicker. The apparent drawback of vertical low pass filtering is loss of vertical resolution in the scan converted display. Thus, a hitherto unsolved need has arisen for a scan converter which includes adaptive vertical low pass filtering to remove flicker while optimizing apparent resolution of the scan-converted television image.

SUMMARY OF THE INVENTION WITH OBJECTS

A general object of the present invention is to provide scan conversion methods and apparatus with adaptive vertical filtering for flicker reduction for use with single bit per pixel computer graphics systems in a manner which overcomes limitations and drawbacks of the prior art.

Accordingly, a television scan converter is provided for converting video generated by single bit per pixel computer graphics systems at a first scan rate into analog video at a second scan rate which is different than the first rate. The scan converter includes a pulse timing generator responsive to horizontal, vertical and pixel clock frequencies at the first scan rate; and to horizontal, vertical and pixel clock frequencies at the second scan rate, for generating clocking signals. A pixel memory array stores incoming pixel bits and retrieves vertical columns of pixel bits of plural scan lines at the first scan rate for each interpolation pixel to be generated. A memory address controller is responsive to the pulse timing generator, and it generates and puts out pixel bit storage and retrieval addresses to the pixel memory array. A pattern recognition filter coefficient generator generates a filter coefficient based upon detection of the incoming vertical pixel pattern. An adaptive vertical low pass filter structure, controlled by the filter coefficient, filters the incoming vertical pixel pattern. An interpolator interpolates the output from the vertical low pass filter structure and puts out an interpolated pixel at the second scan rate so as to minimize video flicker in the resultant interpolation pixels in accordance with the patterns recognized by the pattern recognition filter coefficient generator. An interpolation coefficient generator responsive to the pulse timing generator generates an interpolation coefficient C for each interpolation pixel for controlling operation of the interpolator. A digital to analog converter may be provided to convert the plural bit interpolation pixels into outgoing analog horizontal scan lines at the second scan rate.

In one aspect of the present invention, the first scan rate is 370 progressive scan lines per frame at approximately 60 Hz frame rate, and the second scan rate is 525 scan lines interlaced per frame at an approximate 30 Hz frame rate.

In another aspect of the present invention, the pattern recognition filter coefficient generator, the adaptive vertical low pass filter structure and the interpolator are preferably implemented in a programmable memory array.

In one more aspect of the present invention, the plural predetermined vertical pixel patterns include alternating black and white pixels (checkerboard pattern), single pixel (horizontal line), dual pixel (horizontal bar) and pixel step or window.

In still a further aspect of the present invention, the pixel memory reads at least six vertical pixel bits b[0], b[1], b[2], b[3], b[4], b[5], for each outgoing interpolation pixel i at the second scan rate, and the adaptive vertical low pass filter structure provides two outputs, R and S, to the interpolator in accordance with the following:

$$R = \frac{2 - FC}{2} b[2] + FC \left[ \frac{b[1]}{4} + \frac{b[3]}{4} \right]; \text{ and}$$

-continued $$S = \frac{2 - FC}{2} b[3] + FC \left[ \frac{b[2]}{4} + \frac{b[4]}{4} \right].$$

In yet another aspect of the present invention, the interpolator receives the two filter outputs of the pattern recognition filter and puts out the interpolation pixel i at the second scan rate, in accordance with the following:

$$i = [C * R] + [\overline{C} * S],$$

where the coefficient C is generated by the interpolation coefficient generator equals the distance between the position of pixel bit b[3] scan line and the position of interpolation pixel i, and lies in a range between zero and unity.

These and other objects, aspects, advantages and features of the present invention will become more apparent to those skilled in the art upon consideration of the following detailed description of a preferred embodiment, presented in conjunction with the accompanying drawings.

DETAILED DESCRIPTION OF A PREFERRED EMBODIMENT

DETAILED DESCRIPTION OF A PREFERRED EMBODIMENT

FIGS. 1A, 1B, 1C, 1D and 1E set forth five specific instances of pixel patterns encountered within one specific personal computer type, Apple MAC +or MAC SE (tm), which tend to give rise to varying levels of flicker following scan conversion to an interlaced conventional NTSC signal format. In this particular personal computer graphics architecture, each picture element or "pixel" is accorded one bit, i.e. the pixel is either fully illuminated or it is completely dark. Its gray scale can therefore be completely characterized by a single binary bit, i.e. on or off.

Figure 1A:
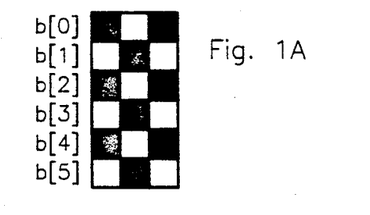
FIGS. 1A, 1B, 1C, 1D, and 1E illustrate four examples of one-bit-per-pixel graphics patterns which give rise to severe flicker artifacts when subjected to uncompensated scan conversion.
Figure 1B:
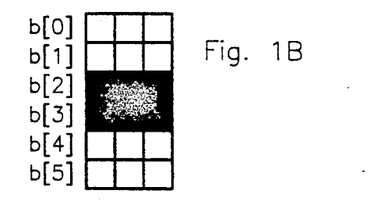

In this particular computer graphics architecture, there are e.g. 370 scan lines which are generated progressively. FIGS. 1A-1E illustrate scan segments of six adjacent scan lines with three pixels per line shown. FIG. 1A illustrates a checkerboard pattern of pixels which is used to generate the appearance of a mid-range gray scale. When this pattern is converted to NTSC, a very objectionable visual flicker and vertical beat pattern accompanies this particular pattern. FIG. 1B illustrates a two-pixel horizontal bar. This pattern also is accompanied by very objectionable flicker when converted to NTSC interlaced scan format.

Figure 1C:
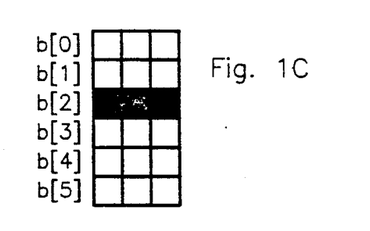
Figure 1D:
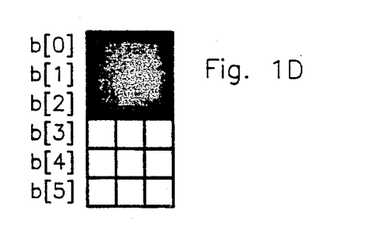

FIG. 1C illustrates a single pixel horizontal line. (It could also correspond to a diagonal line image forming some acute angle with the scan line locii). It has been observed by the inventor that scan conversion of a single pixel horizontal line results in perceptibly less flicker than results from the FIG. 1B two-pixel horizontal bar. Thus, less vertical filtering is needed for the FIG. 1C line pattern than is needed for the FIG. 1B horizontal bar. The FIG. 1D step function denoting a step or window also is characterized by less flicker and requires less vertical filtering.

Figure 1E:
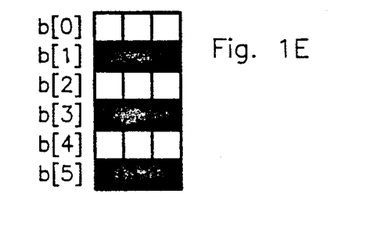

FIG. 1E illustrates an alternating light and dark scan line pattern which presents the greatest flicker, and which requires the greatest filtering. The amount of adaptive vertical low pass filtering required to minimize unwanted flickering artifacts in the scan converted, interlaced video image may be determined as a general rule by the following general statement: the number of vertical level impulses within the six adjacent vertical pixels is directly related to the amount of vertical low pass filtering required to minimize flicker beat patterns and artifacts in the resultant scan converted picture image. By "vertical level impulse" is meant either a black to white to black vertical sequence, or a white to black to white vertical sequence of pixels.

For example, there are four vertical impulses in the pattern depicted in FIG. 1E. A first impulse is found in b[0] (white) to b[1] (black) to b[2] (white). A second impulse is found in b[1] (black) to b[2] (white) to b[3] (black). A third impulse is found in b[2] (white) to b[3] (black) to b[4] (white) And, a fourth impulse is found in b[3] (black) to b[4] (white) to b[5] (black). This situation calls for the most vertical low pass filtering. Three vertical impulses requires somewhat less vertical low pass filtering. Two vertical impulses require still less vertical low pass filtering. One vertical impulse requires the least amount of vertical low pass filtering, and no vertical impulse requires no vertical low pass filtering at all.

Figure 3:
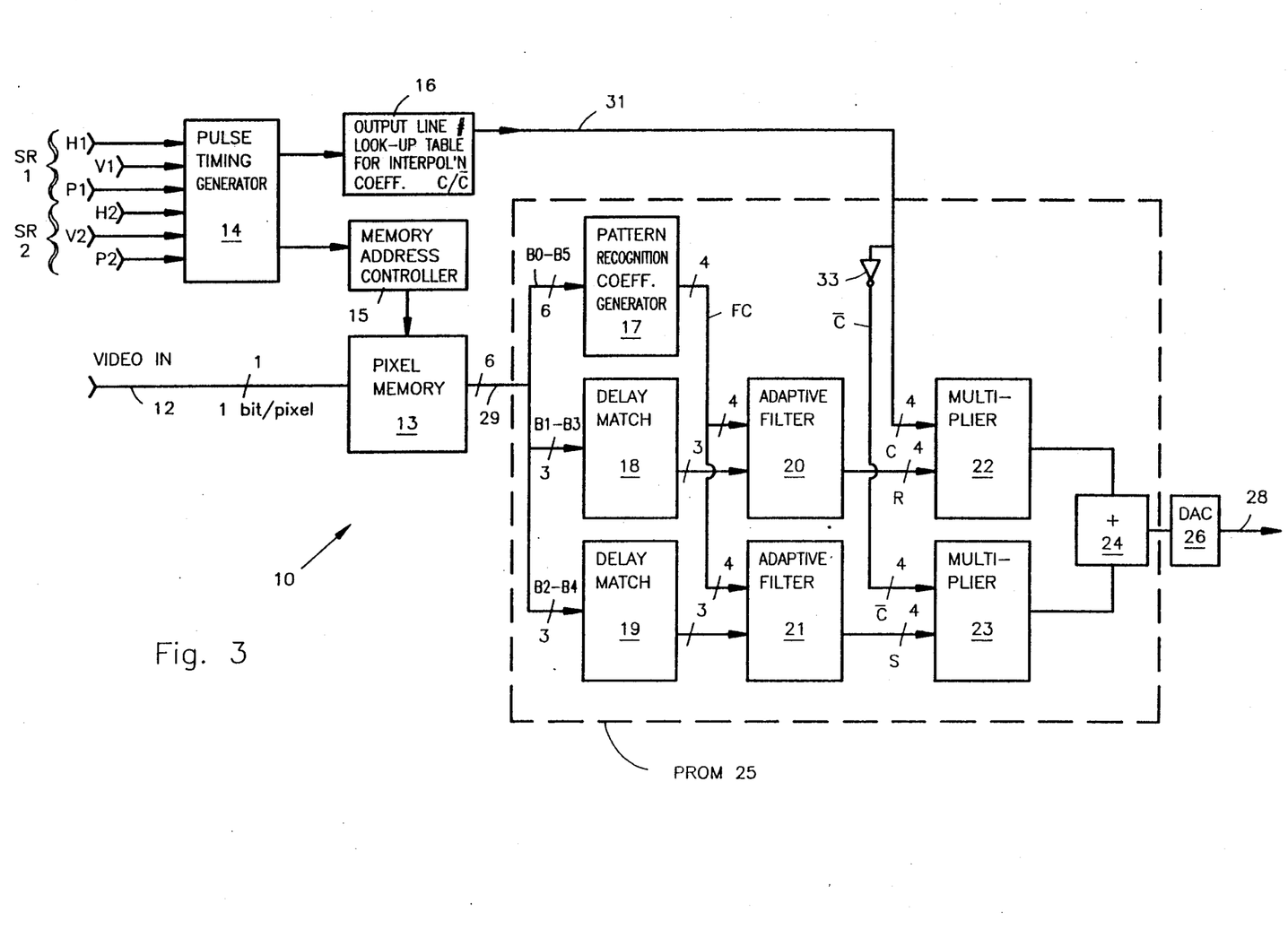
FIG. 3 is a block diagram of a scan converter in accordance with the principles of the present invention.

In accordance with the principles of the present invention, one presently preferred embodiment of which is depicted in FIG. 3, a pixel pattern recognition filter coefficient generator 17 is employed within a scan converter 10 in order to determine the nature of vertical pixel patterns and to generate a filter coefficient FC in order to control the amount of vertical low pass filtering applied to the particular pattern undergoing active scan conversion to the second scan rate.

Figure 2:
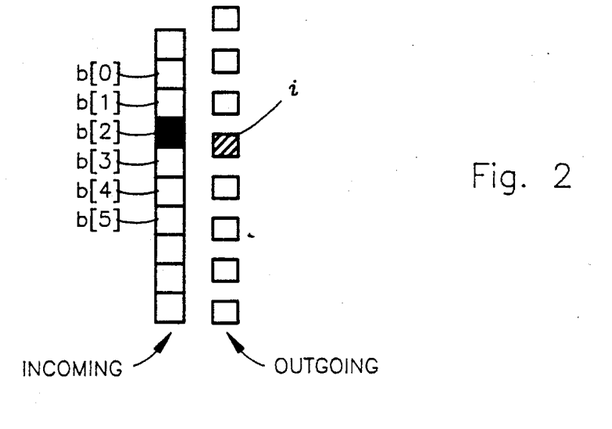
FIG. 2 illustrates a leftmost column of pixels at a first incoming progressive horizontal scan rate and a corresponding rightmost column of pixels at a second outgoing, interlaced scan rate which is approximately 1.4 times the scan rate of the incoming pixels.

With reference to FIG. 2, the left vertical column corresponds to pixels at the incoming scan rate Fl, at successive vertical locations displaced by successive scan lines. Pixels b[0], b[1], b[2], b[3], b[4] and b[5] are of particular interest The pixels are the product of progressive scanning at the F1 scan rate.

The right vertical column depicts an interpolation pixel i at a second scan rate F2. The second scan rate follows an interleave format, such as the conventional NTSC format, nominally 525 lines, and actually 485 video information scan lines. The pixels shown in the right column are spaced apart by one pixel distance, thereby denoting the interleaved scan format. It is apparent that the interpolation pixel i is most closely related in space to incoming pixels b[2] and b[3]. However, it is also apparent that interpolation pixel i is out of phase with incoming pixels b[2] and b[3].

In accordance with an aspect of the invention, the location of the interpolated pixel i is denoted C. In the scan converter 10, described hereinafter in conjunction with FIG. 3, the location C is a value in a range lying from zero to 15 ($2^4$ or a 4-bit value). The location C of the interpolation pixel i shifts relative to adjacent incoming pixels at a phase shift or beat pattern between the incoming and outgoing scan frequencies. As the pixel i moves toward the incoming pixel b[3] and away from the incoming pixel b[2], for example, the gray level of the pixel i will increase from dark to light in the example shown in FIG. 2. It is to be understood that the scan converter 10 puts out scan converted pixels which have gray scales in a predetermined range greater than the incoming binary level (black or white) pixels.

With reference to FIG. 3, a scan converter 10 in accordance with the principles of the present invention includes a single bit per pixel input line 12 for incoming computer graphics video in which each successive pixel is accorded a single bit gray scale (black or white).

The incoming pixels are recorded in a pixel memory array 13 which is sized to contain a frame of lines of incoming video. The memory array 13 is written at the incoming progressive scan rate (SR-1) and is read out at the outgoing interleaved scan rate (SR-2). A pulse timing generator 14 receives horizontal, vertical and pixel clock signals at the incoming scan rate (SR-1) and the same signals at the outgoing rate (SR-2) and generates suitable timing signals. These timing signals are applied to a memory address controller 18 which controls addressing of the memory array 14 in a manner to be described. The pulse timing generator 14 also addresses an output line number lookup table array 16 for interpolation coefficient C. The memory array 16 contains a lookup table for the pixel location interpolation coefficient C which is determined by the output scan line number.

The pixel memory 13 provides a multi-bit output to a pattern recognition filter coefficient generator 17 which generates a four bit vertical low pass filter coefficient FC from the incoming vertical pixel pattern (b[0] through b[5]). The generator 17 functions to recognize sixty four possible pixel patterns within the six bits, such as the patterns depicted in FIGS. 1A-1E.

In the presently preferred embodiment, six bits are put out at a time from the pixel memory 13, namely bits b[0] through b[5]. Conceptually, the six bits being put out at a time for the interpolation of the pixel i correspond to the six incoming pixels b[0] through b[5] as depicted in the left vertical column of FIG. 2. Each vertical pixel pattern is thereupon evaluated for its a priorily known tendency to cause flicker in accordance with the general proposition stated above and in accordance with several special cases for which the filtering level is set empirically. The amount of vertical flicker reduction low pass filtering is controlled for each pattern by e.g. a four bit value FC.

Two delay matches 18 and 19 are provided to match the pixel transit delay caused by the generator 17. The delay 18 delays the incoming pixel bits b[1] through b[3] bits by the predetermined delay amount, and the delay 19 delays the incoming pixel bits b[2] through b[4] by the predetermined delay amounts.

Two adaptive vertical low pass filters 20 and 21 provide vertical low pass filtering which is controlled by the filter coefficient FC. The filter 20 filters the bits b[1] through b[3] from the delay 18, whereas the filter 21 filters the bits b[2] through b[4] from the delay 19. The outputs from the filters 20 and 21 are denoted R and S, and are each four bit values. The following formulas for R and S establish the structure of the transversal low pass filters 20 and 21:

$$R = \frac{2-FC}{2} b[2] + FC\left[\frac{b[1]}{4} + \frac{b[3]}{4}\right]; \text{ and}$$

$$S = \frac{2-FC}{2} b[3] + FC\left[\frac{b[2]}{4} + \frac{b[4]}{4}\right].$$

Notice that when FC equals zero, R is equal to b[2] and S is equal to b[3]; and that when FC is equal to unity, R is equal to ½ b[2]+¼ b[1]+¼ b[3]; and S is equal to ½b[3]+¼ b[2]+¼ b[4]. In the latter case the filters 20 and 21 are each a three tap transversal filter with tap coefficients of ½, ¼ and ¼.

The outputs R and S respectively enter multipliers 22 and 23. The multiplier 22 multiplies R by the interpolation coefficient C to produce a four bit product; and, the multiplier 23 multiplies S by the complementary interpolation coefficient BAR C to produce a four bit product. The interpolation coefficient C is delivered directly to the multiplier 22 from the look-up table 16 over a four bit line 31, whereas the complementary interpolation coefficient BAR C is generated by an inversion process 33 and then delivered to the multiplier 23. The products from the multipliers 22 and 23 are added together in a summing junction 24 to provide e.g. a multibit interpolation pixel i. Preferably, sixteen discrete levels, or more, are provided for the gray level range for each interpolation pixel i.

C equals the distance between the position of the pixel bit b[3] scan line and the position of the interpolation pixel i, and lies in a range between zero and unity. BAR C is the complement of C and also lies in a range between zero and unity. The interpolation pixel, i, is given by the following formula:

i = [C * R] + [BAR C * S].

The pixel i is put out at the second scan rate SR-2, and may be converted into an analog video image stream by a digital to analog converter 26. An output 28 from the converter 26 provides the analog data stream in e.g. the conventional interlaced NTSC video signal format, for example.

Each outgoing pixel has a gray level on a gray scale from zero to fifteen, for example. The interpolation process provides suitable vertical filtering to minimize flicker, depending upon the presence or absence of flicker causing patterns in the incoming video stream. If the vertical pixels adjacent to the interpolation pixel i are all dark, or are all light, then the pixel i will be full dark or full light within the available gray scale range. If vertical patterns and vertical transitions are present at the vicinity of the interpolation pixel i, vertical filtering will be applied in an amount related to the particular pattern recognized. By vertical filtering is meant an adjustment of gray scale of the interpolation pixel i in a manner and to an extent required to minimize flicker artifacts in the interpolated video stream.

Preferably, the pattern recognition filter coefficient generator 17, delay matches 18 and 19, adaptive filters 20 and 21, multipliers 22 and 23, and summing junction 24 are contained within a single memory array 25. The lowest order incoming six bits 0-5 correspond to b[0] through b[5] on the line 29, while the four next incoming bits 6-9 correspond to C on the line 31. In the preferred PROM implementation, BAR C is generated from C within the PROM 25, so that the PROM has 10 bits in: 6 pixel bits and 4 C values. The following table in hexadecimal sets forth the bit values for the array 25, with each address corresponding to a sixteen bit outgoing pixel i, which is based upon the incoming bit pattern. Four adjacent rows (e.g. 00000–0003F) set forth 64 hexadecimal (base 16) characters which correspond to sixty four discrete, sixteen-gray-level pixel values i wherein C equals zero, for example.

The addresses for each of the sixteen C groups, each being of 64 pixel values, are set forth in the program listing as follows:

| | | | |
|---|---|---|---|
| 00000–0003F | C = 0 | 00200–0023F | C = 8 |
| 00040–0007F | C = 1 | 00240–0027F | C = 9 |
| 00080–000BF | C = 2 | 00280–002BF | C = 10 |
| 000C0–000FF | C = 3 | 002C0–002FF | C = 11 |
| 00100–0013F | C = 4 | 00300–0033F | C = 12 |
| 00140–0017F | C = 5 | 00340–0037F | C = 13 |
| 00180–001BF | C = 6 | 00380–003BF | C = 14 |
| 001C0–001FF | C = 7 | 003C0–003FF | C = 15 |

Here follows the program listing for the PROM 25 set forth in hexadecimal format:

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0000 | 00 | 00 | 00 | 00 | 02 | 03 | 02 | 01 | 0B | 0B | 08 | 09 | 0D | 0D | 0E | 0E |
| 0001 | 01 | 01 | 02 | 02 | 07 | 08 | 05 | 05 | 0D | 0D | 0D | 0D | 0F | 0F | 0F | 0F |
| 0002 | 00 | 00 | 00 | 00 | 02 | 03 | 02 | 02 | 0A | 0A | 08 | 08 | 0D | 0D | 0E | 0E |
| 0003 | 01 | 01 | 02 | 02 | 06 | 07 | 04 | 04 | 0E | 0D | 0D | 0D | 0F | 0F | 0F | 0F |
| 0004 | 00 | 00 | 00 | 00 | 03 | 03 | 03 | 02 | 0B | 0A | 08 | 09 | 0D | 0D | 0E | 0E |
| 0005 | 01 | 01 | 02 | 02 | 07 | 08 | 06 | 06 | 0C | 0C | 0C | 0C | 0F | 0F | 0F | 0F |
| 0006 | 00 | 00 | 00 | 00 | 03 | 03 | 03 | 03 | 0A | 0A | 08 | 08 | 0D | 0D | 0E | 0E |
| 0007 | 01 | 01 | 02 | 02 | 06 | 07 | 05 | 04 | 0D | 0C | 0C | 0D | 0F | 0F | 0F | 0F |
| 0008 | 00 | 00 | 00 | 00 | 03 | 03 | 04 | 03 | 0A | 0A | 08 | 09 | 0D | 0D | 0E | 0E |
| 0009 | 01 | 01 | 02 | 02 | 07 | 08 | 06 | 06 | 0B | 0B | 0C | 0C | 0F | 0F | 0F | 0F |
| 000A | 00 | 00 | 00 | 00 | 03 | 03 | 04 | 04 | 09 | 09 | 08 | 08 | 0D | 0D | 0E | 0E |
| 000B | 01 | 01 | 02 | 02 | 06 | 07 | 05 | 05 | 0C | 0B | 0C | 0C | 0F | 0F | 0F | 0F |
| 000C | 00 | 00 | 00 | 00 | 04 | 04 | 04 | 04 | 09 | 09 | 08 | 08 | 0D | 0D | 0E | 0E |
| 000D | 01 | 01 | 02 | 02 | 07 | 08 | 07 | 07 | 0B | 0B | 0B | 0B | 0F | 0F | 0F | 0F |
| 000E | 00 | 00 | 00 | 00 | 04 | 04 | 04 | 04 | 09 | 09 | 08 | 08 | 0D | 0D | 0E | 0E |
| 000F | 01 | 01 | 02 | 02 | 07 | 07 | 06 | 06 | 0B | 0B | 0B | 0B | 0F | 0F | 0F | 0F |
| 0010 | 00 | 00 | 00 | 00 | 04 | 05 | 05 | 04 | 09 | 08 | 08 | 08 | 0D | 0D | 0E | 0E |
| 0011 | 01 | 01 | 02 | 02 | 07 | 08 | 07 | 07 | 0A | 0A | 0B | 0B | 0F | 0F | 0F | 0F |
| 0012 | 00 | 00 | 00 | 00 | 04 | 05 | 05 | 05 | 08 | 08 | 08 | 08 | 0D | 0D | 0E | 0E |
| 0013 | 01 | 01 | 02 | 02 | 07 | 07 | 06 | 0B | 0A | 0B | 0B | 0F | 0F | 0F | 0F | 0F |
| 0014 | 00 | 00 | 00 | 00 | 05 | 05 | 06 | 05 | 08 | 08 | 08 | 08 | 0D | 0D | 0E | 0E |
| 0015 | 01 | 01 | 02 | 02 | 07 | 08 | 08 | 08 | 09 | 09 | 0A | 0A | 0F | 0F | 0F | 0F |
| 0016 | 00 | 00 | 00 | 00 | 05 | 05 | 06 | 06 | 08 | 08 | 08 | 08 | 0D | 0D | 0E | 0E |
| 0017 | 01 | 01 | 02 | 02 | 07 | 07 | 07 | 07 | 0A | 09 | 0A | 0A | 0F | 0F | 0F | 0F |
| 0018 | 00 | 00 | 00 | 00 | 06 | 06 | 06 | 06 | 08 | 07 | 08 | 08 | 0D | 0D | 0E | 0E |
| 0019 | 01 | 01 | 02 | 02 | 07 | 08 | 08 | 08 | 09 | 09 | 0A | 09 | 0F | 0F | 0F | 0F |
| 001A | 00 | 00 | 00 | 00 | 06 | 06 | 06 | 06 | 07 | 07 | 08 | 08 | 0D | 0D | 0E | 0E |
| 001B | 01 | 01 | 02 | 02 | 07 | 07 | 08 | 08 | 09 | 09 | 0A | 09 | 0F | 0F | 0F | 0F |
| 001C | 00 | 00 | 01 | 00 | 06 | 06 | 07 | 07 | 07 | 07 | 08 | 08 | 0D | 0D | 0E | 0E |
| 001D | 01 | 01 | 02 | 02 | 07 | 08 | 09 | 09 | 08 | 08 | 09 | 09 | 0F | 0F | 0F | 0F |
| 001E | 00 | 00 | 01 | 00 | 06 | 06 | 07 | 07 | 06 | 06 | 08 | 08 | 0D | 0D | 0E | 0E |
| 001F | 01 | 01 | 02 | 02 | 07 | 07 | 08 | 08 | 08 | 08 | 09 | 09 | 0F | 0F | 0F | 0F |
| 0020 | 00 | 00 | 01 | 01 | 07 | 06 | 08 | 08 | 06 | 06 | 07 | 07 | 0D | 0D | 0F | 0F |
| 0021 | 01 | 01 | 02 | 02 | 08 | 08 | 09 | 09 | 07 | 07 | 09 | 08 | 0E | 0E | 0F | 0F |
| 0022 | 00 | 00 | 01 | 01 | 07 | 06 | 08 | 08 | 06 | 06 | 08 | 07 | 0D | 0D | 0F | 0F |
| 0023 | 00 | 00 | 02 | 02 | 08 | 08 | 09 | 09 | 07 | 07 | 09 | 08 | 0E | 0E | 0F | 0F |
| 0024 | 00 | 00 | 01 | 01 | 08 | 07 | 09 | 09 | 06 | 06 | 07 | 07 | 0D | 0D | 0F | 0F |
| 0025 | 00 | 00 | 02 | 02 | 08 | 08 | 0A | 0A | 06 | 06 | 08 | 08 | 0E | 0E | 0F | 0F |
| 0026 | 00 | 00 | 01 | 01 | 07 | 07 | 09 | 09 | 06 | 06 | 08 | 07 | 0D | 0D | 0F | 0F |
| 0027 | 00 | 00 | 02 | 02 | 08 | 08 | 09 | 09 | 06 | 06 | 08 | 08 | 0E | 0E | 0F | 0F |
| 0028 | 00 | 00 | 01 | 01 | 08 | 08 | 09 | 0A | 05 | 05 | 07 | 07 | 0D | 0D | 0F | 0F |
| 0029 | 00 | 00 | 02 | 02 | 08 | 08 | 0A | 0A | 06 | 06 | 08 | 07 | 0E | 0E | 0F | 0F |
| 002A | 00 | 00 | 01 | 01 | 08 | 08 | 09 | 09 | 05 | 05 | 08 | 07 | 0D | 0D | 0F | 0F |
| 002B | 00 | 00 | 02 | 02 | 08 | 08 | 0A | 0A | 05 | 06 | 08 | 07 | 0E | 0E | 0F | 0F |

| | | | | | | | | | | | | | | | |
|---|---|---|---|---|---|---|---|---|---|---|---|---|---|---|---|
| 002C | 00 | 00 | 01 | 01 | 09 | 08 | 0A | 0B | 04 | 04 | 07 | 07 | 0D | 0D | 0F 0F |
| 002D | 00 | 00 | 02 | 02 | 08 | 08 | 0B | 0B | 05 | 05 | 07 | 07 | 0E | 0E | 0F 0F |
| 002E | 00 | 00 | 01 | 01 | 08 | 08 | 0A | 0A | 05 | 05 | 08 | 07 | 0D | 0D | 0F 0F |
| 002F | 00 | 00 | 02 | 02 | 08 | 08 | 0B | 0B | 04 | 05 | 07 | 06 | 0E | 0E | 0F 0F |
| 0030 | 00 | 00 | 01 | 01 | 09 | 09 | 0B | 0B | 04 | 04 | 07 | 07 | 0D | 0D | 0F 0F |
| 0031 | 00 | 00 | 02 | 02 | 08 | 08 | 0B | 0B | 04 | 04 | 07 | 06 | 0E | 0E | 0F 0F |
| 0032 | 00 | 00 | 01 | 01 | 09 | 09 | 0B | 0B | 04 | 04 | 08 | 07 | 0D | 0D | 0F 0F |
| 0033 | 00 | 00 | 02 | 02 | 08 | 08 | 0B | 0B | 04 | 04 | 07 | 06 | 0E | 0E | 0F 0F |
| 0034 | 00 | 00 | 01 | 01 | 0A | 09 | 0B | 0C | 03 | 03 | 07 | 06 | 0D | 0D | 0F 0F |
| 0035 | 00 | 00 | 02 | 02 | 08 | 08 | 0C | 0C | 04 | 04 | 06 | 05 | 0E | 0E | 0F 0F |
| 0036 | 00 | 00 | 01 | 01 | 0A | 09 | 0B | 0B | 03 | 03 | 08 | 07 | 0D | 0D | 0F 0F |
| 0037 | 00 | 00 | 02 | 02 | 09 | 08 | 0C | 0C | 03 | 04 | 06 | 05 | 0E | 0E | 0F 0F |
| 0038 | 00 | 00 | 01 | 01 | 0B | 0A | 0C | 0D | 03 | 03 | 07 | 06 | 0D | 0D | 0F 0F |
| 0039 | 00 | 00 | 02 | 02 | 08 | 08 | 0C | 0C | 03 | 03 | 06 | 05 | 0E | 0E | 0F 0F |
| 003A | 00 | 00 | 01 | 01 | 0A | 0A | 0C | 0C | 03 | 03 | 08 | 07 | 0D | 0D | 0F 0F |
| 003B | 00 | 00 | 02 | 02 | 09 | 08 | 0C | 0D | 02 | 03 | 06 | 04 | 0E | 0E | 0F 0F |
| 003C | 00 | 00 | 01 | 01 | 0B | 0A | 0D | 0E | 02 | 02 | 07 | 06 | 0D | 0D | 0F 0F |
| 003D | 00 | 00 | 02 | 02 | 08 | 08 | 0D | 0D | 02 | 02 | 05 | 04 | 0E | 0E | 0F 0F |
| 003E | 00 | 00 | 01 | 01 | 0B | 0A | 0D | 0D | 03 | 03 | 08 | 07 | 0D | 0D | 0F 0F |
| 003F | 00 | 00 | 02 | 02 | 09 | 08 | 0D | 0D | 01 | 02 | 05 | 04 | 0E | 0E | 0F 0F |

```
#include <stdio.h>
#include <math.h>
#include <stdlib.h>
#include <sys/stat.h>
#include <fcntl.h>
main()
{
FILE   *printer;
int j,k,b[6],nbyte,handle,interp_coef;
int impulse1,impulse2,impulse3,impulse4,doubimp1,doubimp2,doubimp3;
double  interp,coef_impulse,coef_doubimp,coef_final,filter[6];
unsigned char str[10],interp2[1025] = "";
printer = fopen("PRN","w");

interp_coef = -1;
k = 0;

/***** GO THROUGH THE 16 POSSIBLE INTERPOLATION COEFFICIENTS *****/
while (interp_coef++ < 15)
        {
        j = -1;

/*** FOR EACH INTERPOLATION COEFFICIENT THERE ARE 63 PIXEL COMBINATIONS ***/
        while (j++ < 63)
                {
                b[0] = j & 1;           /* PIXEL 0 ON LINE 0 */
                b[1] = (j & 2)/2;       /* PIXEL 1 ON LINE 1 */
                b[2] = (j & 4)/4;       /* PIXEL 2 ON LINE 2 */
                b[3] = (j & 8)/8;       /* PIXEL 3 ON LINE 3 */
                b[4] = (j & 16)/16;     /* PIXEL 4 ON LINE 4 */
                b[5] = (j & 32)/32;     /* PIXEL 5 ON LINE 5 */

/* FIGURE OUT WHETHER EACH PIXEL IS AN IMPULSE       */
                /* AND GIVE THE CENTER 2 PIXELS A HIGHER WEIGHTING */
                impulse1 = (!b[0] ^ b[2])&(b[1] ^ b[2]);
                impulse2 = 2 * ((!b[1] ^ b[3])&(b[2] ^ b[3]));
                impulse3 = 2 * ((!b[2] ^ b[4])&(b[3] ^ b[4]));
                impulse4 = (!b[3] ^ b[5])&(b[4] ^ b[5]);
```

```c
/* FIGURE OUT WHETHER EACH SET OF 2 PIXELS ARE AN IMPULSE */
doubimp1 = (!b[0] ^ b[3])&(!b[1] ^ b[2])&(b[0] ^ b[1]);
doubimp2 = (!b[1] ^ b[4])&(!b[2] ^ b[3])&(b[1] ^ b[2]);
doubimp3 = (!b[2] ^ b[5])&(!b[3] ^ b[4])&(b[2] ^ b[3]);

/* CALCULATE ONE FILTER COEFFICIENT BY SUMMING THE */
/* WEIGHTED NUMBER OF IMPULSES */
coef_impulse = ((float)(impulse1 + impulse2 + impulse3
+ impulse4))/12;

/* CALCULATE ANOTHER FILTER COEFFICIENT BY ORING THE */
/* DOUBLE IMPULSES */
coef_doubimp = 0.0;
if (doubimp1||doubimp3||doubimp2) coef_doubimp = .2;

/** SET THE FINAL FILTER COEFFICIENT TO BE THE MAXIMUM **/
/** OF THE IMPULSE COEFFICIENT AND THE DOUBLE IMPULSE **/
/** COEFFICIENT **/
if(coef_doubimp > coef_impulse) coef_final = coef_doubimp;
else coef_final = coef_impulse;

/* SET THE MINIMUM FILTER COEFFICIENT TO BE .08333 */
if (coef_final == 0.0)coef_final = .08333;

/* FILTER PIXEL 2 USING THE CALCULATED FILTER COEFFICIENT */
filter[2] = ( (double) b[2]  + coef_final *
((double) b[1] + (double) b[3]))/(1 + 2 * coef_final) ;

/* FILTER PIXEL 3 USING THE CALCULATED FILTER COEFFICIENT */
filter[3] = ( (double) b[3] + coef_final *
((double) b[2] + (double) b[4]))/(1 + 2 * coef_final);

/* CALCULATE THE INTERPOLATED VALUE USING THE FILTERED */
/* PIXELS 2 & 3 */
interp = filter[2] * ((float)interp_coef)/15 +
         filter[3] * ((float)(15-interp_coef))/15 ;

/* CONVERT THE INTERPOLATED VALUE TO A 4 BIT INTEGER */
/* AND STORE IT IN AN ARRAY */
interp2[k++] = (int) floor( interp * 15 + .5);
}

/**** STORE THE ARRAY INTO A FILE ON DISC TO BE LATER BURNT INTO A PROM ****/
printf(" filename ? ");
gets(str);
nbyte = 1024;
_fmode = O_BINARY;
handle = open(str,O_CREAT);
write(handle,interp2,nbyte);
close(handle);
}
```

Having thus described a presently preferred embodiment of the present invention, it will now be appreciated that the objects of the invention have been fully achieved, and it will be understood by those skilled in the art that many changes in construction and widely varying embodiments, techniques and applications of the invention will suggest themselves without departure from the spirit and scope of the present invention. The disclosures and the description given hereinbefore are therefore purely illustrative and are not intended to be in any sense limiting.

I claim:

1. A television scan converter for converting video generated by single pixel bit computer graphics systems at a first scan rate into analog video at a second scan rate which is different than the first rate, the converter comprising:

clocking means responsive to horizontal, vertical and pixel clock frequencies at the first scan rate and horizontal, vertical and pixel clock frequencies at the second scan rate for generating clocking signals, pixel memory array means for storing incoming pixel bits at the first scan rate and for retrieving vertical columns of predetermined numbers of vertically adjacent pixel bits of plural scan lines at the second scan rate, memory address controller means responsive to the clocking means for generating and putting out pixel bit storage and retrieval addresses to the pixel memory array means, pattern recognition filter coefficient generator means for generating a filter coefficient by detecting a bit pattern of each said vertical column of pixel bits read out from the pixel memory array means, adaptive vertical low pass filter means connected to receive delay matched predetermined adjacent groups of pixel bits of said vertical column for adaptively low pass filtering the predetermined adjacent groups in response to the filter coefficient, so as to minimize video flicker artifacts in resultant interpolation pixels at the second scan rate in accordance with the bit patterns detected by the pattern recognition filter coefficient generator means, interpolator means connected to the adaptive vertical low pass filter means and responsive to an interpolation coefficient C, for generating and putting out as a stream the interpolation pixels at the second scan rate, and interpolation coefficient generator means responsive to the clocking means for generating the interpolation coefficient C for each interpolation pixel for controlling operation of the interpolator means.

2. The television scan converter set forth in claim 1 further comprising digital to analog converter means for converting the plural bit interpolation pixels put out by the interpolator means into an analog data stream comprising horizontal scan lines for display at the second scan rate.

3. The television scan converter set forth in claim 1 wherein the first scan rate is 370 progressive scan lines per frame at an approximate 60 Hz frame rate, and the second scan rate is 525 scan lines interlaced per frame at an approximate 30 Hz frame rate.

4. The television scan converter set forth in claim 1 wherein the pattern recognition filter coefficient generator means, the adaptive vertical low pass filter means and the interpolator means are implemented as a programmed read only memory array.

5. The television scan converter set forth in claim 1 wherein the pattern recognition filter coefficient generator means detects plural predetermined vertical pixel patterns including alternating black and white pixels, single pixel (horizontal line), dual pixel (horizontal bar) and pixel step or window from said bit pattern for each said vertical column read out from the pixel memory array means.

6. The television scan converter set forth in claim 1 wherein the pixel memory array means stores at least six vertical pixel bits b[0], b[1], b[2], b[3], b[4], and b[5], for each interpolation pixel i, and wherein the adaptive vertical low pass filter means provides two filter outputs R and S in accordance with the following relationship:

$$R = \frac{2 - FC}{2} b[2] + FC \left[ \frac{b[1]}{4} + \frac{b[3]}{4} \right]; \text{ and}$$

$$S = \frac{2 - FC}{2} b[3] + FC \left[ \frac{b[2]}{4} + \frac{b[4]}{4} \right].$$

7. The television scan converter set forth in claim 6 wherein the interpolator means receives the two filter outputs R and S and puts out the interpolation pixel i, in accordance with the following:

i=[C * R]+[BAR C * S], wherein C and BAR C lie in a range between zero and unity, and wherein BAR C is the complement of C.

8. The television scan converter set forth in claim 7 wherein the pattern recognition filter coefficient generator means generates the filter coefficient as a value lying in a range between zero and fifteen.

9. The television scan converter set forth in claim 6 wherein the adaptive vertical low pass filter means comprises two adaptive transversal low pass filters, a first filter connected to receive from the pixel memory array means and to adaptively filter pixel bits b[1], b[2] and b[3] and put out R for each interpolation pixel i to be generated; and, a second filter connected to receive from the pixel memory array means and to adaptively filter pixel bits b[2], b[3] and b[4] and put out S for each interpolation pixel i to be generated.

10. The television scan converter set forth in claim 9 further comprising a delay match in each path between the pixel memory array means and the first and second filters, in order to match the delay incurred in the pattern recognition filter coefficient generator means.

11. The television scan converter set forth in claim 9 wherein the interpolator means comprises two multipliers, a first multiplier which receives the output R and a second multiplier which receives the output S, wherein the first multiplier multiplies R by the interpolation coefficient C, wherein the second multiplier multiplies S a complement interpolation coefficient BAR C, and wherein C and BAR C lie in a range between zero and unity, and further comprising summing means for summing outputs from the first and second multipliers.

12. The television scan converter set forth in claim 1 wherein the interpolator means generates and puts out each interpolation pixel having a plural-bit gray scale.

13. A method for converting video generated by single pixel bit computer graphics systems at a first scan rate into analog video at a second scan rate which is different than the first rate, the method comprising the steps of:

generating clocking signals responsive to horizontal, vertical and pixel clock frequencies at the first scan rate and horizontal, vertical and pixel clock frequencies at the second scan rate, storing incoming pixel bits in a pixel memory array means at the first scan rate and retrieving vertical columns of predetermined numbers of vertically adjacent pixel bits of plural scan lines from the pixel memory array means at the second scan rate, generating and putting out pixel bit storage and retrieval addresses to the pixel memory array means in order to carry out the said storing and retrieving steps, generating a filter coefficient by detecting a bit pattern of each said vertical column of pixel bits retrieved from the pixel memory array means, adaptively low pass filtering delay matched predetermined adjacent groups of pixel bits in said vertical column in response to the filter coefficient so as to minimize video flicker artifacts in a resultant stream of interpolation pixels i in accordance with the bit patterns detected by the pattern recognition filter coefficient generator means, interpolating a scan converted pixel i by generating and putting out as a stream the interpolation pixels at the second scan rate in response to an interpolation coefficient C. and generating the interpolation coefficient C for each interpolation pixel for controlling the operation of the interpolation step.

14. The scan converting method set forth in claim 13 comprising the further step of converting the stream of interpolation pixels put out by the interpolation step into an analog data stream comprising horizontal scan lines for display at the second scan rate.

15. The scan converting method as set forth in claim 13 wherein the step of interpolating a scan converted pixel i by generating and putting out as a stream the interpolation pixels at the second scan rate includes the step of generating and putting out each interpolation pixel with a plural-bit gray scale.

16. The scan converting method set forth in claim 13 wherein the first scan rate is 370 progressive scan lines per frame at an approximate 60 Hz frame rate, and the second scan rate is 525 scan lines interlaced per frame at an approximate 30 Hz frame rate.

17. The scan converting method set forth in claim 13 wherein the storing step stores at least six vertical pixel bits b[0], b[1], b[2], b[3], b[4], and b[5], for each interpolation pixel i, and wherein the adaptive low pass filtering step results in two filter outputs R and S in accordance with the following relationship:

$$R = \frac{2 - FC}{2} b[2] + FC\left[\frac{b[1]}{4} + \frac{b[3]}{4}\right]; \text{ and}$$

$$S = \frac{2 - FC}{2} b[3] + FC\left[\frac{b[2]}{4} + \frac{b[4]}{4}\right].$$

18. The scan converting method set forth in claim 17 wherein the interpolating step receives the two filter outputs R and S and puts out the interpolation pixel i, in accordance with the following:

i = [C * R] + [BAR C * S].

wherein C and BAR C lie in a range between zero and unity, and wherein BAR C is the complement of C.

19. The scan converting method set forth in claim 13 wherein the generating a filter coefficient step comprises the step of generating the filter coefficient as a value lying in a range between zero and fifteen.

20. A method for controlling the amount of vertical low pass filtering within a scan converter for converting video generated by single pixel bit computer graphics systems at a first scan rate into analog video at a second scan rate comprising the steps of reading a bit pattern of a vertical column of pixel bits retrieved from a pixel memory array means, detecting a number of vertical impulses occurring in the read bit pattern and establishing the magnitude of a filter coefficient for controlling the amount of vertical low pass filtering in relation to the number of detected vertical impulses occurring within the vertical bit pattern.

* * * * *